(12) United States Patent
van Leyen

(10) Patent No.: US 11,441,689 B2
(45) Date of Patent: *Sep. 13, 2022

(54) CERAMIC DISC VALVE CARTRIDGE

(71) Applicant: Spectrum Brands, Inc., Middleton, WI (US)

(72) Inventor: Jan van Leyen, Irvine, CA (US)

(73) Assignee: Spectrum Brands, Inc., Middleton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/174,627

(22) Filed: Feb. 12, 2021

(65) Prior Publication Data

US 2021/0239223 A1    Aug. 5, 2021

Related U.S. Application Data

(63) Continuation of application No. 16/176,065, filed on Oct. 31, 2018, now Pat. No. 10,920,895.

(60) Provisional application No. 62/580,330, filed on Nov. 1, 2017.

(51) Int. Cl.
*F16K 11/074* (2006.01)

(52) U.S. Cl.
CPC ...... *F16K 11/0746* (2013.01); *F16K 11/0743* (2013.01)

(58) Field of Classification Search
CPC .............. F16K 19/006; F16K 11/0746; F16K 11/0743; F16K 31/605; Y10T 137/9464
USPC ....................................................... 137/801
See application file for complete search history.

(56) References Cited

U.S. PATENT DOCUMENTS

| 2,209,991 | A | ‡ | 8/1940 | McGill | ...................... F16K 3/10 251/159 |
| 3,680,592 | A | * | 8/1972 | Hayman | .............. F16K 11/0782 137/625.4 |
| 7,100,630 | B2 | ‡ | 9/2006 | Vu | ............................ E03C 1/04 137/625.41 |

(Continued)

FOREIGN PATENT DOCUMENTS

| DE | 3218091 A1 | 1/1983 | |
| FR | 2 506 886 A1 ‡ | 12/1982 | ............. F16K 19/00 |
| FR | 2506886 A1 | 12/1982 | |

OTHER PUBLICATIONS

International Search Report and Written Opinion for Application No. PCT/US2018/058224 dated Jan. 31, 2019.‡

(Continued)

*Primary Examiner* — Michael R Reid
(74) *Attorney, Agent, or Firm* — Merchant & Gould P.C.

(57) ABSTRACT

A valve cartridge includes a valve body that defines a hot water port that has a first end and a second end. The valve body includes a cold water port that has a first end and a second end. The valve cartridge includes a rotatable control stem that is disposed at least partially within the valve body. The valve body includes a main flow control disc that is coupled to the control stem. The main flow control disc has a cold water opening and a hot water opening. The valve cartridge includes a first auxiliary disc positioned between the first end of the hot water port and the main flow control disc and a second auxiliary disc positioned between the first end of the cold water port and the main flow control disc.

19 Claims, 14 Drawing Sheets

(56) References Cited

U.S. PATENT DOCUMENTS

| | | |
|---|---|---|
| 8,191,567 B2 ‡ | 6/2012 | Lorch .................... E03C 1/04 |
| | | 137/315.13 |
| 8,191,587 B2 | 6/2012 | Leuchinger et al. |
| 10,920,895 B2 * | 2/2021 | van Leyen .......... F16K 11/0743 |
| 2012/0222763 A1 ‡ | 9/2012 | Yang .................... F16K 17/34 |
| | | 137/625.4 |
| 2013/0312856 A1 ‡ | 11/2013 | Huffington ............ F16K 37/005 |
| | | 137/557 |
| 2016/0341325 A1 ‡ | 11/2016 | Ye ..................... G05D 23/1313 |

OTHER PUBLICATIONS

English language translation of CN First Office Action, dated Sep. 30, 2021, for CN patent application No. 201880071149.5 (19 pages).

\* cited by examiner
‡ imported from a related application

CERAMIC DISC VALVE CARTRIDGE

CROSS REFERENCE TO RELATED APPLICATION

This application is a continuation of U.S. patent application Ser. No. 16/176,065, filed Oct. 31, 2018, now U.S. Pat. No. 10,920,895; which claims the benefit of U.S. Provisional Patent Application Ser. No. 62/580,330, filed Nov. 1, 2017, which applications are hereby incorporated by reference in their entireties.

BACKGROUND

Valve cartridges are used to control the mixing of hot and cold fluid (e.g., water) from input lines before the fluid is sent to output structures, such as showerheads and bathtub spigots. Often these valve cartridges are connected to, and controlled by, a single rotatable handle. As the handle is rotated, the water that is output from the output structures gets colder or hotter (i.e., the proportion of cold and hot water is changed) via the valve cartridge. To ensure proper sealing and to increase the longevity of the valve cartridges, valve cartridges often include components that limit how easily the handle, and thereby valve cartridge, can be rotated. Therefore, there is a need for a valve cartridge that has adequate longevity and that can be easily rotated for operation.

SUMMARY

The present disclosure relates generally to mixing valves. In one possible configuration, and by non-limiting example, the mixing valve disclosed herein includes a plurality of ceramic discs.

In one example of the present disclosure, a valve cartridge is disclosed. The valve cartridge includes a valve body that defines a hot water port that has a first end and a second end. The valve body includes a cold water port that has a first end and a second end. The valve cartridge includes a rotatable control stem that is disposed at least partially within the valve body. The valve body includes a main flow control disc that is coupled to the control stem. The main flow control disc has a cold water opening and a hot water opening. The valve cartridge includes a first auxiliary disc positioned between the first end of the hot water port and the main flow control disc and a second auxiliary disc positioned between the first end of the cold water port and the main flow control disc.

In another example of the present disclosure, a valve cartridge is disclosed. The valve cartridge includes a valve body that includes a hot water port that has a first end and a second end. The valve body also includes a cold water port that has a first end and a second end. The valve cartridge includes a rotatable control stem that is disposed at least partially within the valve body. The valve cartridge includes a main flow control disc that is coupled to the control stem. The main flow control disc includes a cold water opening and a hot water opening. The cold water opening and the hot water opening selectively correspond with the hot water port and cold water port, respectively. The valve cartridge includes at least one auxiliary disc positioned adjacent to, and in contact with, the main flow control disc. The at least one auxiliary disc is positioned around a first end of only a single hot or cold water port.

In another example of the present disclosure, a valve cartridge is disclosed. The valve cartridge includes a rotatable control stem that is disposed at least partially within a valve body. The valve cartridge includes a main flow control disc that is coupled to the control stem. The main flow control disc has a cold water opening and a hot water opening. The valve cartridge includes a first auxiliary disc that has a first face positioned adjacent to, and in contact with, the main flow control disc. The first auxiliary disc has a central aperture. The valve cartridge includes a second auxiliary disc having a first face positioned adjacent to, and in contact with, the main flow control disc. The second auxiliary disc has a central aperture. The valve cartridge includes a first seal positioned adjacent to, and in contact with, a second, opposite face of the first auxiliary disc. The valve cartridge includes a second seal positioned adjacent to, and in contact with, a second, opposite face of the second auxiliary disc. The hot water opening of the main control disc selectively corresponds with the central aperture of the first auxiliary disc, and the cold water opening of the main control disc selectively corresponds with the central aperture of the second auxiliary disc. The main flow control disc, first auxiliary disc, and second auxiliary disc are constructed of a ceramic material.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
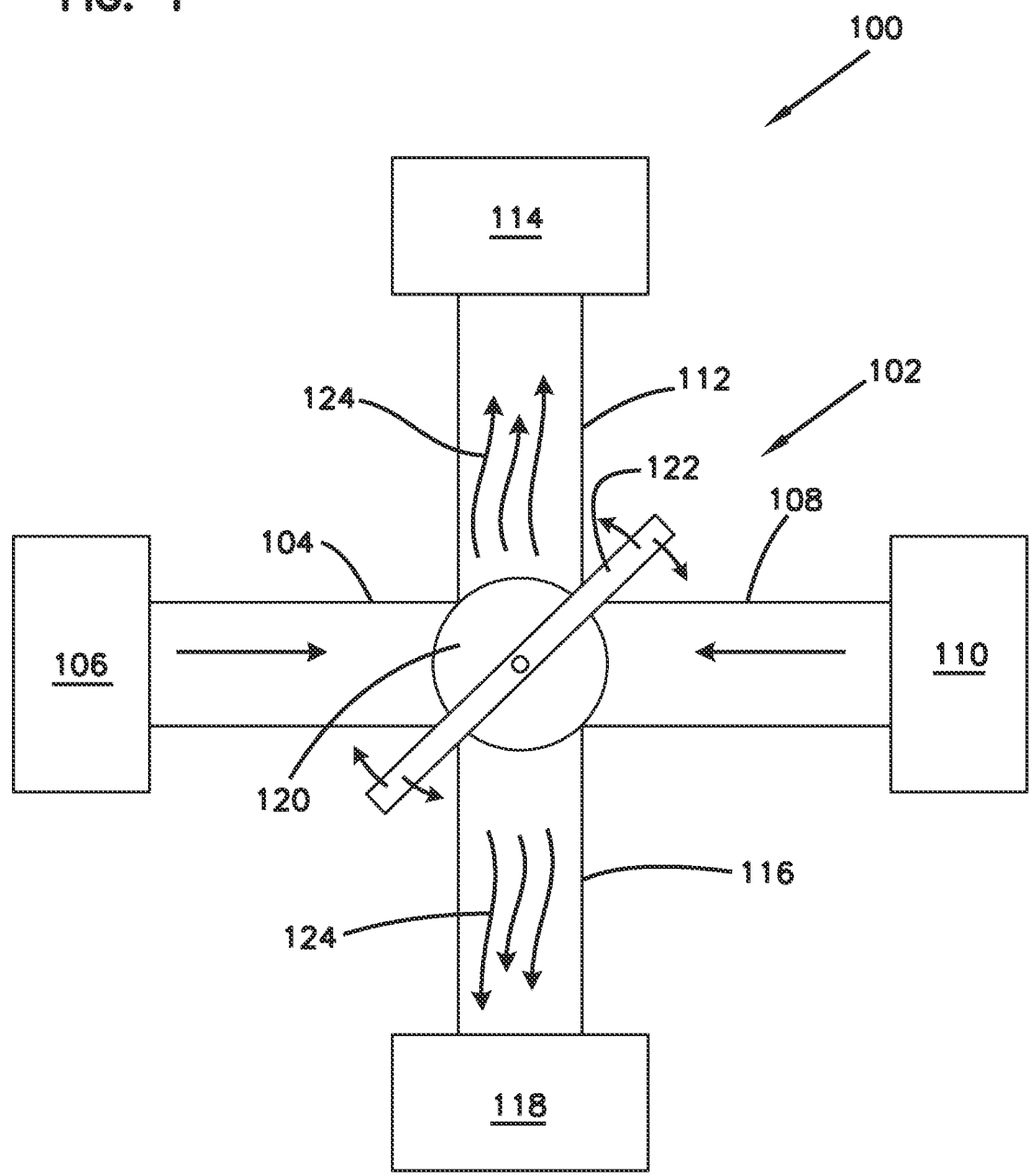
FIG. 1 illustrates a schematic view of a water delivery system, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The valve cartridge disclosed herein has several advantages. In some examples, the valve cartridge includes ceramic flow control discs to increase the longevity of the valve cartridge and to reduce the torque required to rotate a control stem of valve cartridge.

FIG. 1 shows a schematic view of a water delivery system 100. In the depicted example. The water delivery system 100 includes a valve body 102 that includes a hot water source arm 104 that is in communication with a hot water source 106, a cold water source arm 108 that is in communication with a cold water source 110, a first fluid delivery arm 112 that is in communication with a first fluid delivery device 114, and a second fluid delivery arm 116 that is in communication with a second fluid delivery device 118. In some examples, the valve body 102 includes only a single fluid delivery arm 112, 116. In other examples still, the water delivery system 100 includes only a single fluid delivery device 114, 118. In other examples still, the water delivery system 100 includes a plurality of fluid delivery devices 114, 118.

The valve body 102 includes a valve cartridge 120 removably disposed therein near an intersection of the hot water source arm 104, the cold water source arm 108, the first fluid delivery arm 112, and the second fluid delivery arm 116. As shown, the water delivery system 100 includes a handle 122 in communication with the valve cartridge 120. As the handle 122 is rotated, the handle 122 operates the valve cartridge 120 so that the valve cartridge 120 selectively delivers a stream of water 124 (i.e., either hot, cold, or a mixture of hot and cold) to the first and/or second fluid delivery device 114, 118. In some examples, the valve cartridge 120, handle 122, and other associated components may be referred to as a mixing valve.

The valve body 102 can be a standard behind the wall valve body 102 that is commonly used in showers. In other examples, the valve body 102 can be a valve body commonly utilized in a sink faucet.

The fluid delivery devices 114, 118 can be spouts, spigots, heads, or the like that are configured to deliver the stream of water 124 to the user operating the valve cartridge 120. In some examples, the fluid delivery devices 114, 118 can be a showerhead and a bathtub spigot.

Figure 2:
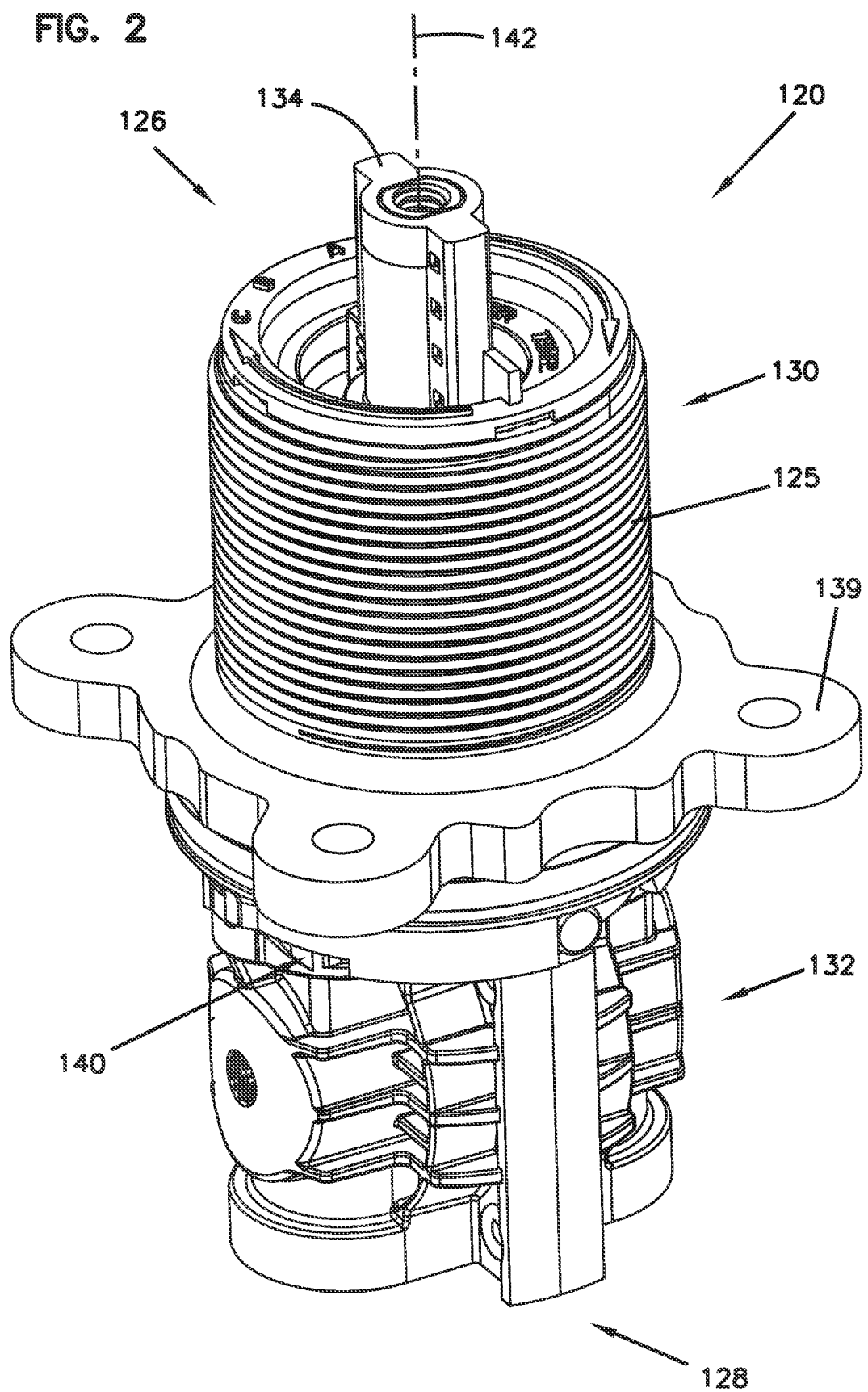
FIG. 2 illustrates a perspective view of a valve cartridge, according to one embodiment of the present disclosure.
Figure 3:
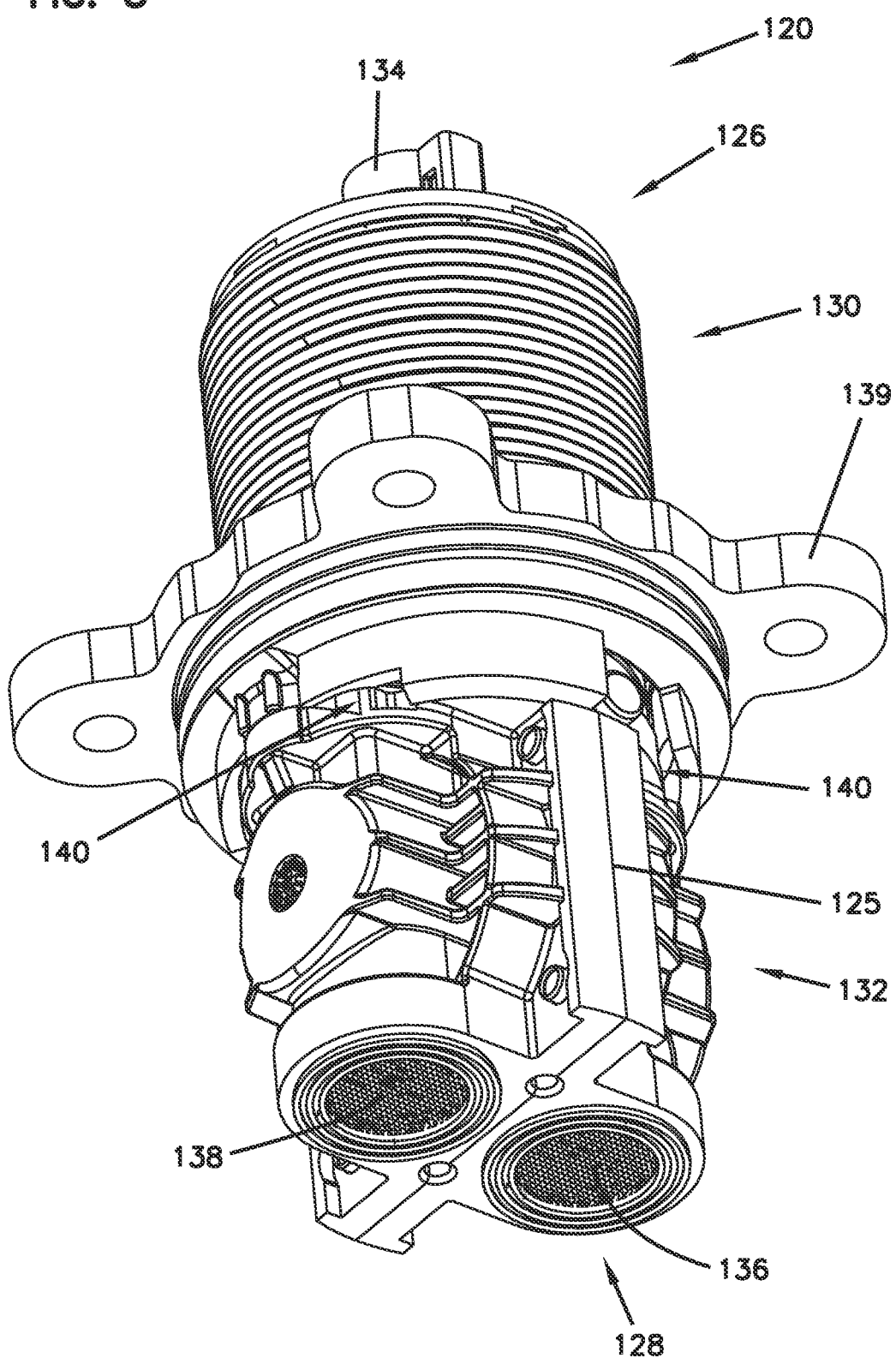
FIG. 3 illustrates another perspective view of the valve cartridge of FIG. 2.
Figure 4:
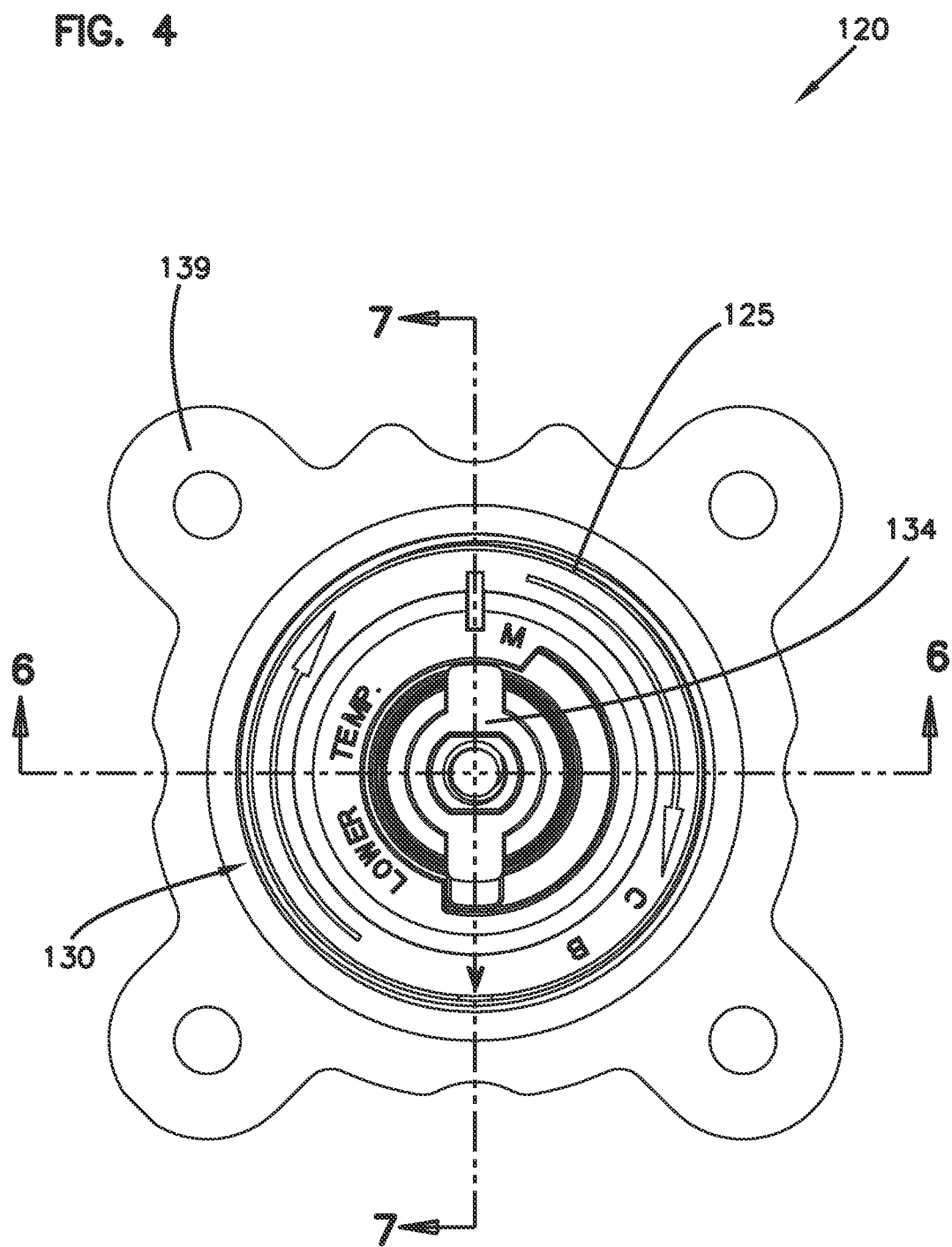
FIG. 4 illustrates a top view of the valve cartridge of FIG. 2.

FIGS. 2 and 3 show a perspective view of the valve cartridge 120. FIG. 4 shows a top view of the valve cartridge 120.

The valve cartridge 120 includes a main body 125, a first end 126, a second end 128, and a mixing assembly 130 mated with a pressure balance assembly 132. At the first end 126, the valve cartridge 120 includes a stem 134 protruding from the mixing assembly 130. At the second end 128, the valve cartridge 120 includes a hot water inlet 136 and a cold water inlet 138. The hot water inlet 136 is configured to receive hot water from the hot water source 106 via the hot water source arm 104 of the valve body 102, and the cold water inlet 138 is configured to receive cold water from the cold water source 110 via the cold water source arm 108 of the valve body 102. The valve cartridge 120 also includes a flange 139 for mounting the valve cartridge 120 to the valve body 102.

The mixing assembly 130, as will be discussed in more detail here, is configured to selectively mix hot water received at the hot water inlet 136 with cold water received at the cold water inlet 138 and supply the water stream 124 via a plurality of outlets 140 disposed around the main body 125. The water stream 124 is then delivered to the first and/or second fluid delivery device 114, 118 via the valve body 102, as noted above. In some examples, after the water stream 124 leaves the outlets 140, the water stream 124 flows between an inner surface of a cylindrical port (not shown) of the valve body 102 and the pressure balance assembly 132 of the valve cartridge 120, which is positioned within the cylindrical port. In some examples, the mixing assembly 130 is positioned outside of the valve body 102.

The pressure balance assembly 132 is configured to balance the pressure of the hot and cold water received at the hot and cold water inlets 136, 138. In some examples, the pressure balance assembly 132 can be a spool-type pressure balancing valve of the type known in the art. One example of a pressure balance assembly is disclosed in U.S. Pat. No. 7,100,630, the disclosure of which is hereby incorporated by reference in its entirety. In some examples, the pressure balance assembly 132 is positioned inside of the valve body 102.

The stem 134 is rotatable about a central axis 142 relative to the main body 125 of the valve cartridge 120. The stem 134 is configured to be attached the handle 122. In some examples, the handle 122 can be a knob, a dial, or other like structure.

Figure 5:
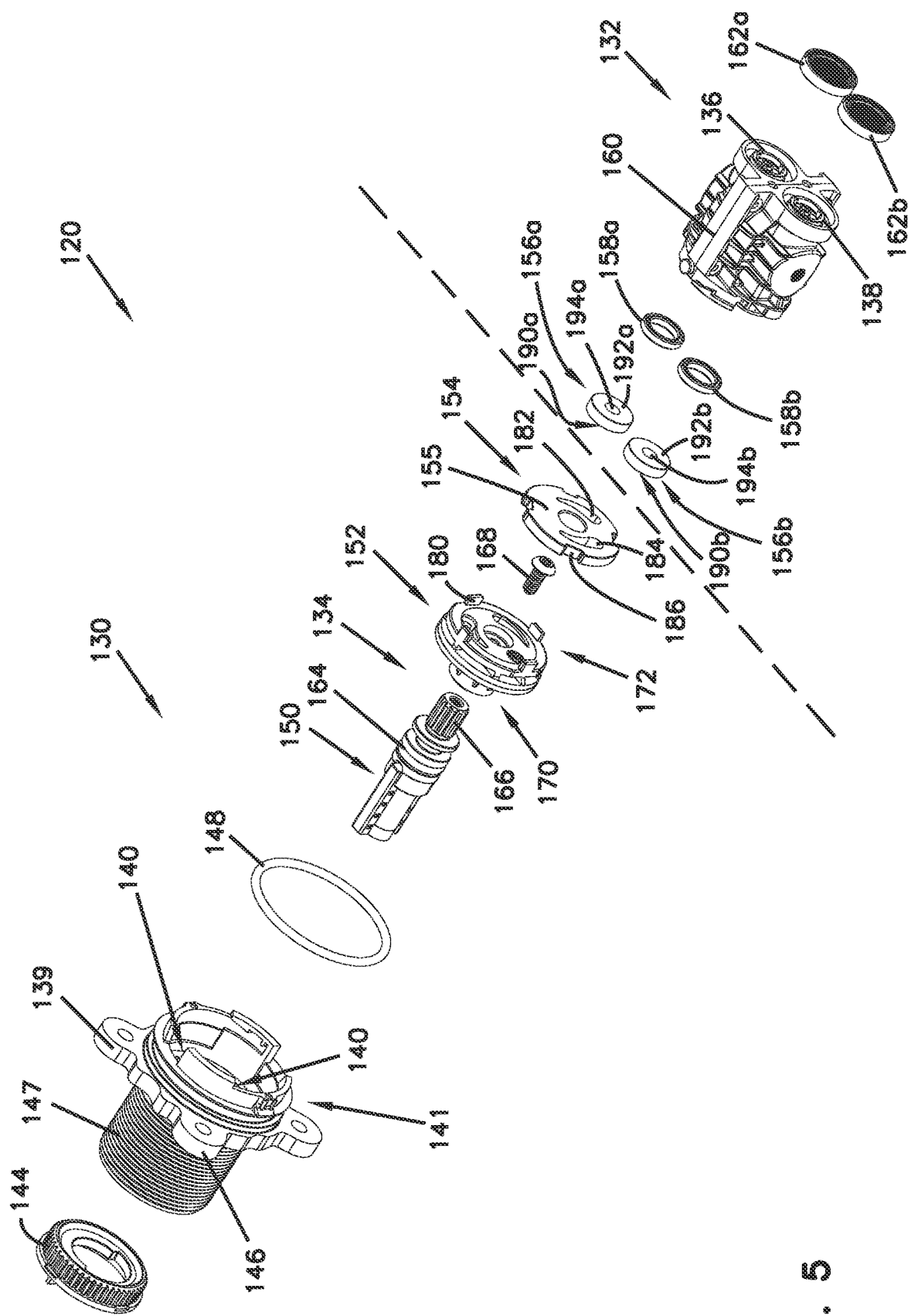
FIG. 5 illustrates an exploded view of the valve cartridge of FIG. 2.

FIG. 5 shows an exploded view of the valve cartridge 120. The mixing assembly 130 and the pressure balance assembly 132 are shown separated by a dashed line.

The mixing assembly 130 is shown to include a hot water limiter 144, a housing 146, an outer seal 148, the stem 134 which includes a shaft 150 and a head 152, and a main flow control disc 154. The pressure balance assembly 132 is shown to include a pair auxiliary discs 156a, 156b, a pair of auxiliary disc seals 158a, 158b, a housing 160, and a pair of screens 162a, 162b.

The hot water limiter 144 is used to limit the amount of hot water that is mixed with cold water received in the water stream 124 that is provided at the outlets 140. In some examples, the hot water limiter 144 limits the rotation of the stem 134 when positioned within the housing 146. In some examples, the hot water limiter 144 can be a hot water limiter of the type known in the art.

The housing 146 of the mixing assembly 130 is part of the main body 125 of the valve cartridge 120. In the depicted embodiment, the housing 146 can include exterior threads 147 to receive other components of the water delivery system 100 (not shown) and the flange 139.

The outer seal 148 is configured to be positioned around the housing 146 to form a seal with the valve body 102 and the housing 146. Specifically, the outer seal 148 is positioned around the housing 146 at a location between the flange 139 and an end 141 that interfaces with the pressure balance assembly 132. In some examples, the outer seal 148 is a rubber O-ring.

The shaft 150 of the stem 134 is configured to interface with the handle 122 and the stem head 152 so that rotation of the handle 122 about the central axis 142 of the stem 134 rotates the shaft 150 and the stem head 152. In some examples, the shaft 150 is at least partially positioned within the housing 146. The stem 134 also includes a seal 164 positioned around the shaft 150 to form a seal between the shaft 150 and the housing 146. The shaft 150 is connected to the head 152 at a mating interface 166. In some examples, the mating interface 166 is a splined interface. In some examples, the shaft 150 is secured to the head 152 by way of a fastener 168.

The head 152 of the stem 134 is configured to be attached to the shaft 150 at a first end 170 and configured to interface with the flow control disc 154 at a second end 172. The stem head 152 includes a plurality of projections 180 at the second end 172 that are sized and shaped to interface within the flow control disc 154 to transfer torque between the stem 134 and the main flow control disc 154. When mated with the flow control disc 154, rotation of the stem head 152 about the central axis 142 of the stem 134 causes rotation of the flow control disc 154 about the about the central axis 142.

The flow control disc 154 includes a hot water opening 182, a cold water opening 184, and a plurality of periphery recesses 186. As the flow control disc 154 is rotated by the stem 134, the hot water opening 182 and the cold water opening 184 selectively align with hot and cold water ports 198, 199 (shown in FIG. 6) defined by housing 160 of the pressure balance assembly 132. The hot and cold water ports 198, 199 are in fluid communication with the hot and cold water inlets 136, 138, respectively. As the hot and cold water openings 182, 184 of the flow control disc 154 selectively align with the hot and cold water ports 198, 199, water is proportionally mixed to create the water stream 124.

The periphery recesses 186 of the flow control disc 154 are sized and shaped to receive the projections 180 of the stem head 152 to facilitate simultaneous rotation, and torque transfer, of the stem head 152 and the flow control disc 154.

The flow control disc 154 can be constructed from a wide range of materials such as plastic or metal. In one example, the flow control disc 154 is constructed from a ceramic material such as aluminum oxide.

The flow control disc 154 is configured to mate with, and be in contact with, the first and second auxiliary discs 156a, 156b at a bearing face 155 (i.e. an interface surface). The flow control disc 154 is rotatable relative to the first and second auxiliary discs 156a, 156b. The first and second auxiliary discs 156a, 156b have a first side 190a, 190b that is configured to mate and be in contact with the flow control disc 154. In some examples, at the first side 190, the first and/or second auxiliary disc 156a, 156b includes raised ridges/rings that are configured to be in contact with the bearing face 155 of flow control disc 154, thereby reducing the contact patch between the flow control disc 154 and the first and second auxiliary discs 156a, 156b. At a second side 192a, 192b, the first and second auxiliary discs 156a, 156b are configured to be in contact with the auxiliary disc seals 158a, 158b. Further, the first and second auxiliary discs 156a, 156b are configured to be non-rotatably positioned within the housing 160 of the pressure balance assembly 132.

In the depicted embodiment, the first and second auxiliary discs 156a, 156b each include a central aperture 194a, 194b. The central apertures 194a, 194b are configured to align with the hot and cold water ports 198, 199 of the pressure balance assembly 132.

The first and second auxiliary discs 156a, 156b can be constructed from a wide range of materials such as plastic or metal. In one example, the first and second auxiliary discs 156a, 156b are constructed from a ceramic material such as aluminum oxide.

The first and second auxiliary disc seals 158a, 158b are configured to be positioned between the first and second auxiliary discs 156a, 156b and the housing 160. In some examples, the seals 158a, 158b are flexible and configured to be compressed. In some examples, the seals 158a, 158b are rubber seals.

The housing 160 of the pressure balance assembly 132 is part of the main body 125 of the valve cartridge 120. The housing 160 houses a pressure balancing valve 197 (shown in FIG. 6) and defines the hot and cold water ports 198, 199 (shown in FIG. 6).

The screens 162a, 162b are sized and shaped to positioned over the hot and cold inlets 136, 138 to aid in filtering the water from the hot and cold sources 106, 110 before the water enters the valve cartridge 120.

Figure 6:
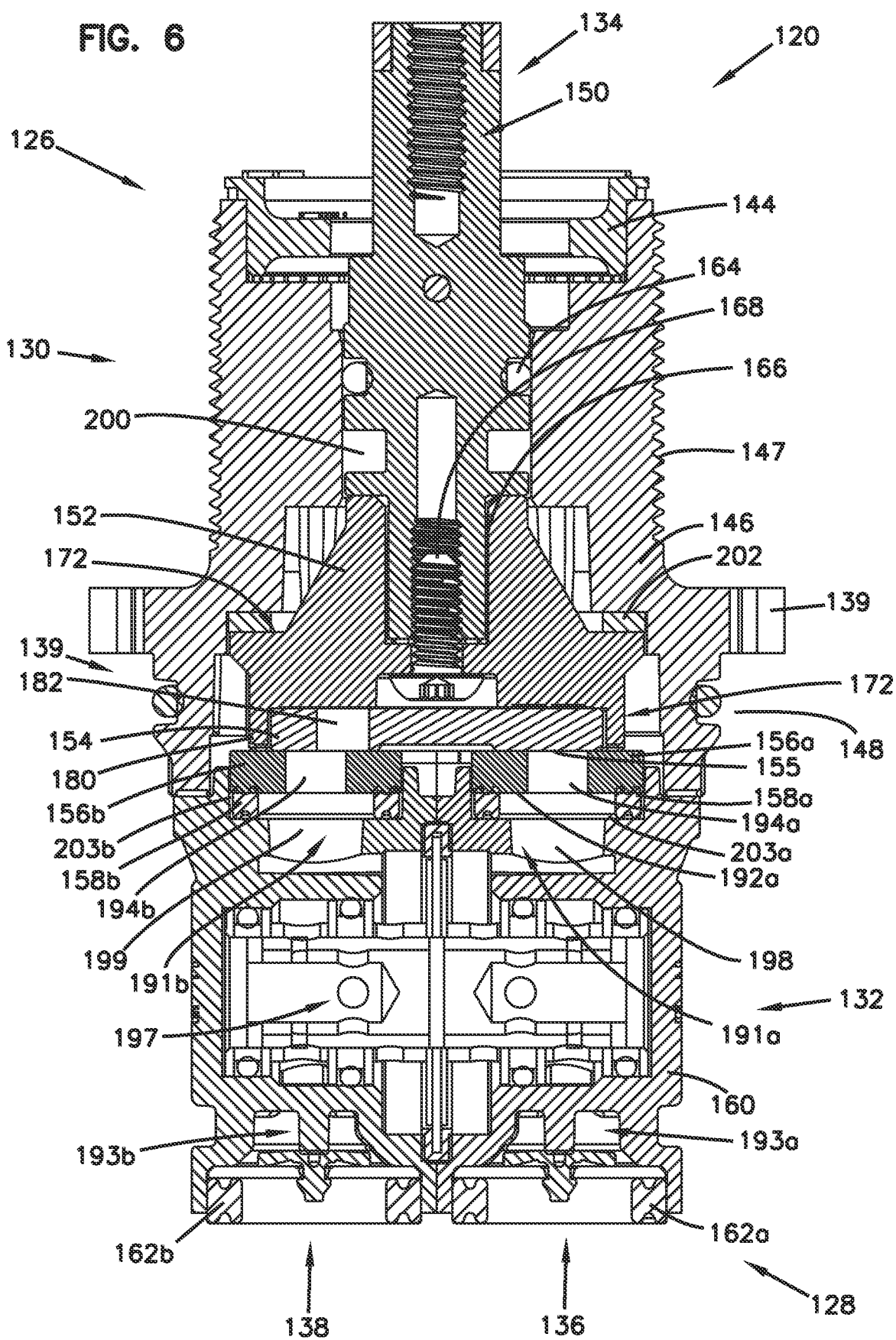
FIG. 6 illustrates a cross-sectional view of the valve cartridge along line 6-6 in FIG. 4.

FIG. 6 shows a cross sectional view of the valve cartridge 120 along line 6-6 in FIG. 4. As shown, the pressure balance assembly 132 includes the pressure balance valve 197. Further, the housing 160 defines the hot water port 198 and the cold water port 199. The hot water port 198 and the cold water port 199 each include first ends 191a, 191b and second ends 193a, 193b. The first ends 191a, 191b of the hot and cold water ports 198, 199 are adjacent the control disc 154 while the second ends 193a, 193b are adjacent the hot and cold water inlets 136, 138. Each hot and cold water port 198, 199 corresponds with, and is in fluid communication with, the hot and cold water inlets 136, 138 respectively. In the depicted example, the hot and cold water ports 198, 199 each travel through the pressure balance valve 197 between the first ends 191a, 191b and second ends 193a, 193b.

The stem 134 is shown to be positioned within a cavity 200 defined by the housing 146 of the mixing assembly 130. Specifically, the stem head 152 is shown to be positioned between a stop shoulder 202 (which can include a bushing) at the second end 172 of the head 152 and the main control disc 154 at the first side 170 of the head 152. In some examples, when assembled, the stem 134, via the head 152, exerts a force toward the first and second auxiliary discs 156a, 156b to partially compress the first and second auxiliary disc seals 158a, 158b between the housing 160, specifically within recesses 203a, 203b defined by the housing 160, and the first and second auxiliary discs 156a, 156b.

The first and second auxiliary discs 156a, 156b are spaced apart from one another within the recesses 203a, and 203b. Each auxiliary disc 156a, 156b extends a common distance from the hot and cold water openings 182, 184 of the control disc 154. The first and second auxiliary discs 156a, 156b concurrently interface to different portions of the bearing face 155 of main flow control disc 154 during operation.

Figure 7:
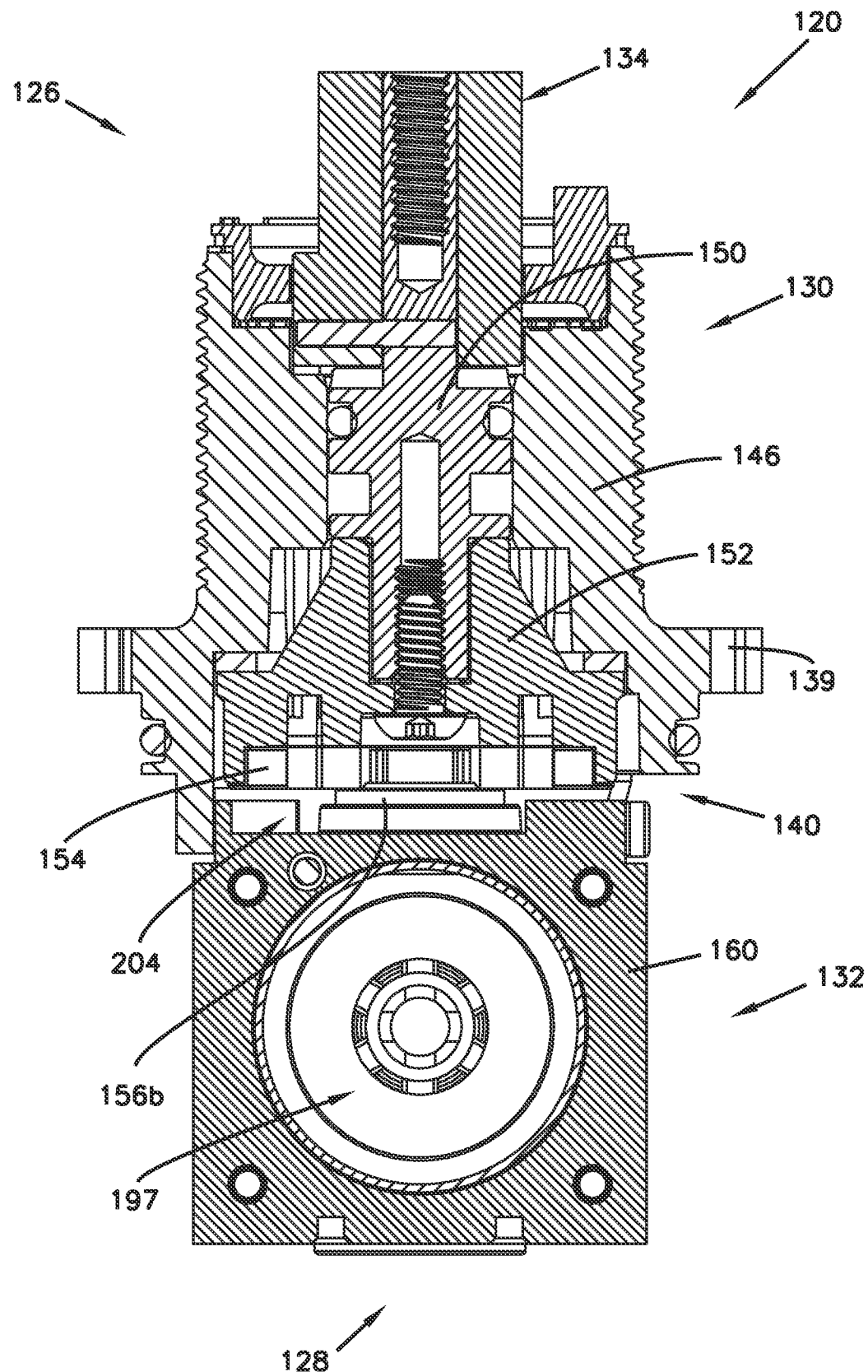
FIG. 7 illustrates a cross-sectional view of the valve cartridge along line 7-7 in FIG. 4.
Figure 8:
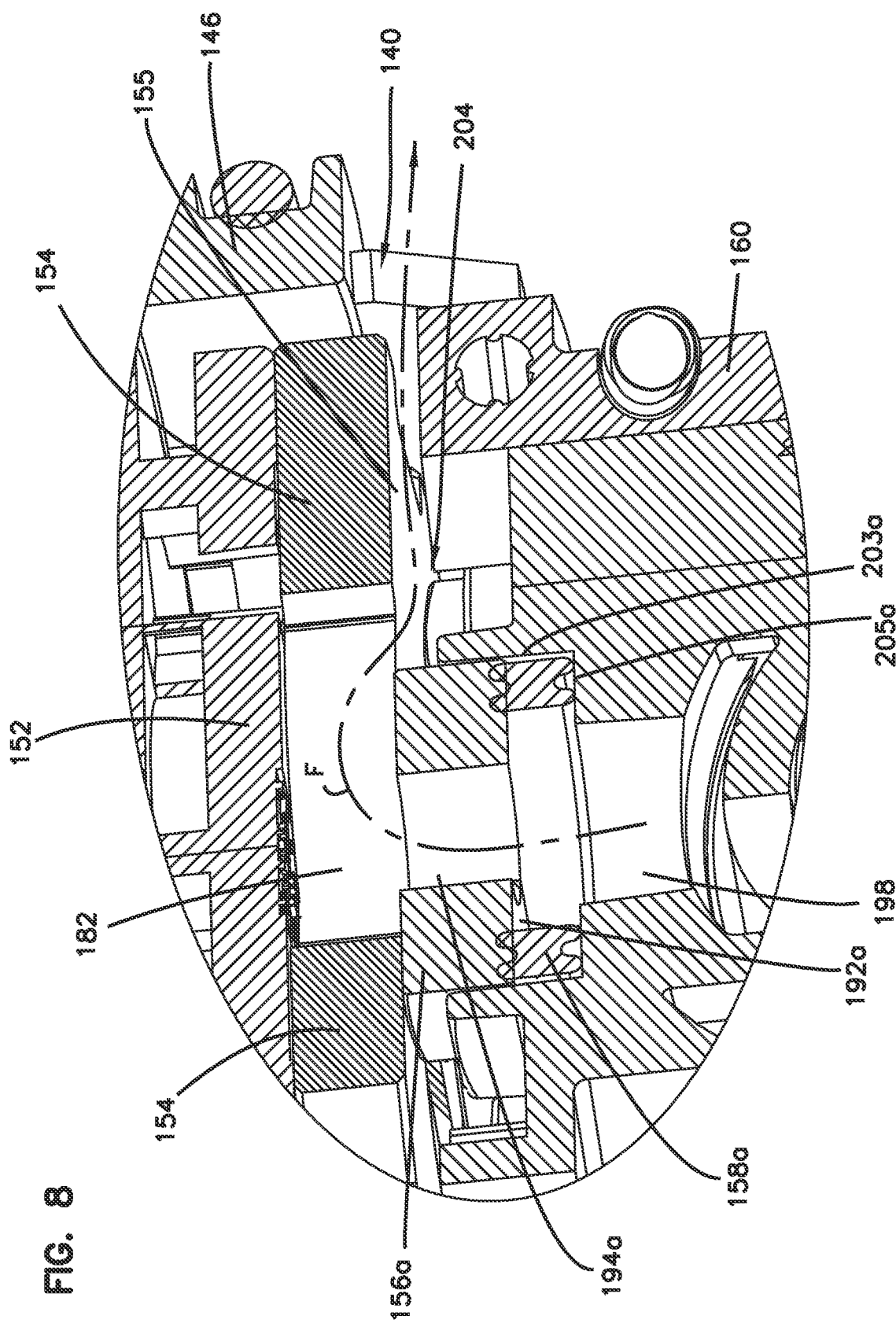
FIG. 8 illustrates a perspective cross-sectional view of a portion of the valve cartridge of FIG. 2.

The flow control disc 154 is positioned within an outlet cavity 204 that is defined between the housing 146 of the mixing assembly 130 and the housing 160 of the pressure balance assembly 132. The outlet cavity 204 is in communication with the plurality of outlets 140, as shown in FIGS. 7 and 8. The hot and cold water openings 182, 184 of the flow control disc 154 are configured to selectively place the central apertures 194a, 194b of the first and second auxiliary discs 156a, 156b in fluid communication with the outlet cavity 204 and thereby the outlets 140. In some examples, water flows into the hot and cold water ports 198, 199 after passing through the pressure balance valve 197.

During operation of the valve cartridge 120, as the flow control disc 154 is rotated by the stem 134, the bearing face 155 of the flow control disc 154 contacts the first sides 190a, 190*b* of first and second auxiliary discs 156*a*, 156*b*. Such contact between the bearing face 155 and the first and second auxiliary discs 156*a*, 156*b* effects the amount of torque required to rotate the stem 134. In some examples, the required torque to rotate the stem 134 is less than about 12.5 in-lbs of torque. In some examples, the required torque to rotate the stem 134 is between about 5 in-lbs and 8 in-lbs of torque. In some examples, the torque required to rotate the stem 134 from an OFF positioned (i.e., no water flowing out of the outlets 140) is higher than the torque required to the rotate the stem 134 when the stem 134 is in the ON position (i.e., water flowing from the outlets 140).

FIG. 7. shows a cross section along line 7-7 in FIG. 4. As shown, the outlet cavity 204 is in communication with the outlets 140 to allow fluid within the outlet cavity 204 to exit the valve cartridge 120 via the outlet 140.

FIG. 8 shows a cross section that illustrates the fluid communication between the hot water port 198 and the outlet 140. Specifically, fluid communication is illustrated by a dashed line F and fluid flows between the hot water port 198, central aperture 194*a* of the first auxiliary disc 156*a*, hot water opening 182 of the flow control disc 154, outlet cavity 204, and the outlet 140. Substantially similar fluid communication selectively exists between the cold water port 199, the central aperture 194*b* of the second auxiliary disc 156*b*, cold water opening 184 of the flow control disc 154, outlet cavity 204, and the outlet 140.

As shown in FIG. 8, the first auxiliary disc seal 158*a* is positioned within the recess 203*a*. Specifically, the first auxiliary disc seal 158*a* is positioned between a shoulder 205*a* of the recess 203*a* and the second side 192*a* of the first auxiliary disc 156*a*. The first auxiliary disc seal 158*a* aids in preventing water from traveling around the first auxiliary disc 156*a*, between the first auxiliary disc 156*a* and the recess 203*a*.

As noted above, because the flow control disc 154 is rotatable relative to the first and second auxiliary discs 156*a*, 156*b*, and thereby the hot and cold ports 198, 199, the alignment of the hot and cold water openings 182, 184 of the flow control disc 154 can be altered to meter the amount of water that passes from the hot and cold water ports 198, 199 and into the outlet cavity 204. When the hot water opening 182 and the central aperture 194*a* are at least partially aligned, fluid then flows from the central aperture 194*a*, through the hot water opening 182 and into the outlet cavity 204. When the hot water opening 182 and the central aperture 194*a* are not aligned, fluid is prevented from traveling out of the central aperture 194*a* by way of the bearing face 155 of the control disc 154. Such is the case with the cold water opening 184 and the central aperture 194*b* as well.

FIGS. 9-14 show the main flow control disc 154 and the first and second auxiliary discs 156*a*, 156*b* in the same mated relationship that the main flow control disc 154 and the first and second auxiliary discs 156*a*, 156*b* exist in within the assembled valve cartridge 120.

Figure 9:
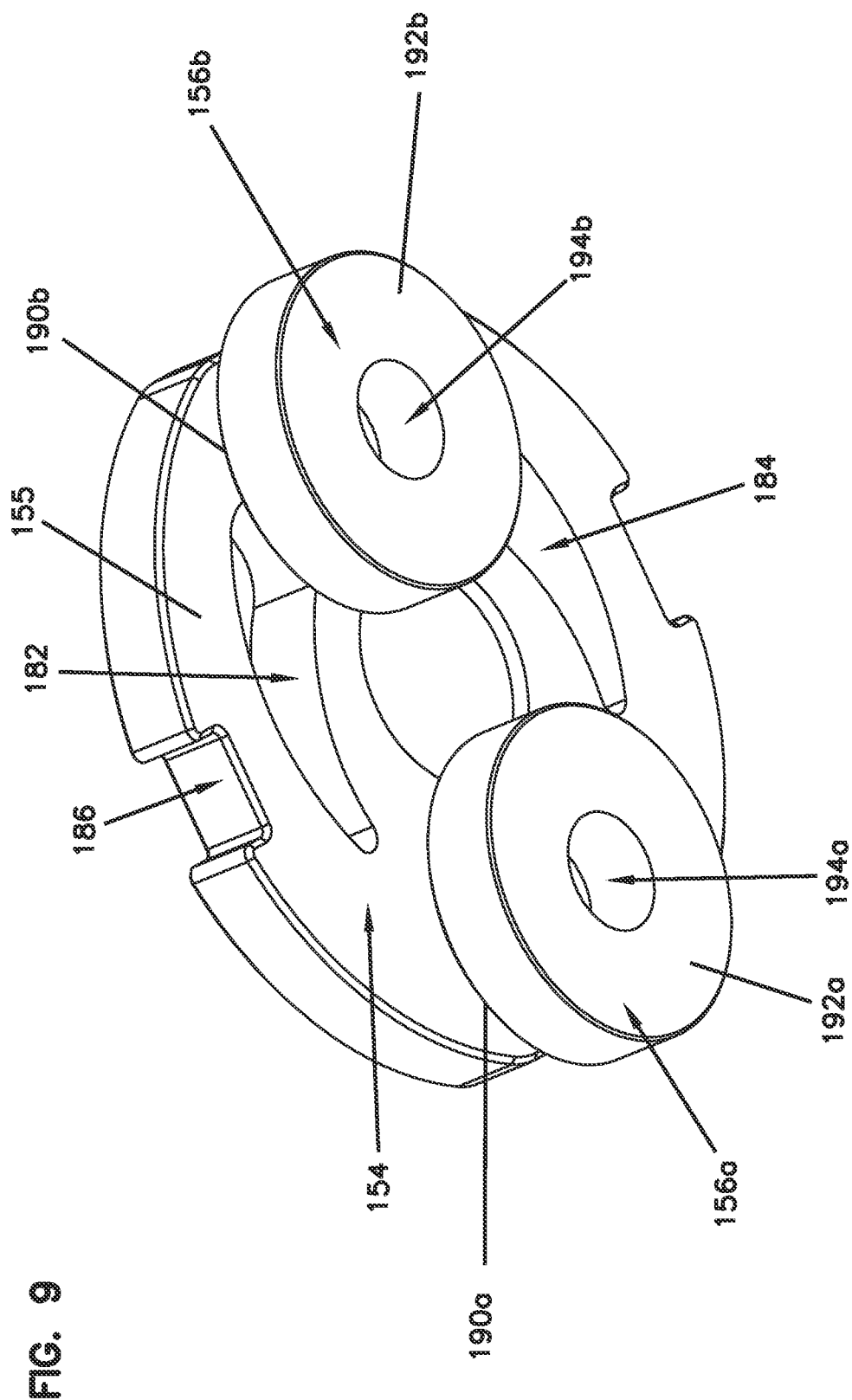
FIG. 9 illustrates a perspective view of a flow control disc and a pair of auxiliary discs of the valve cartridge of FIG. 2 in an OFF position.

FIG. 9 shows a perspective view of the main flow control disc 154 and the first and second auxiliary discs 156*a*, 156*b* when the main flow control disc 154 is in an OFF position. As shown, the central apertures 194*a*, 194*b* of the first and second auxiliary discs 156*a*, 156*b* are misaligned with the hot and cold openings 182, 184 of the control disc 154.

In some examples, a maximum contact surface area between the bearing face 155 of the flow control disc 154 and the first sides 190*a*, 190*b* of first and second auxiliary discs 156*a*, 156*b* is about 35% of the surface of area of the bearing face 155 of the control disc 154. In some examples, less than the entire bearing face 155 contacts the first sides 190*a*, 190*b* of first and second auxiliary discs 156*a*, 156*b*. In some examples, the control disc 154 and first and second auxiliary discs 156*a*, 156*b* are constructed of the same material. In some examples, the control disc 154 and first and second auxiliary discs 156*a*, 156*b* are both constructed of a ceramic material. In other examples, the control disc 154 and first and second auxiliary discs 156*a*, 156*b* are constructed of the different materials. In other examples still, at least one of the bearing face 155 of the control disc 154 and the first sides 190*a*, 190*b* of the first and second auxiliary discs 156*a*, 156*b* include a low friction coating.

Figure 10:
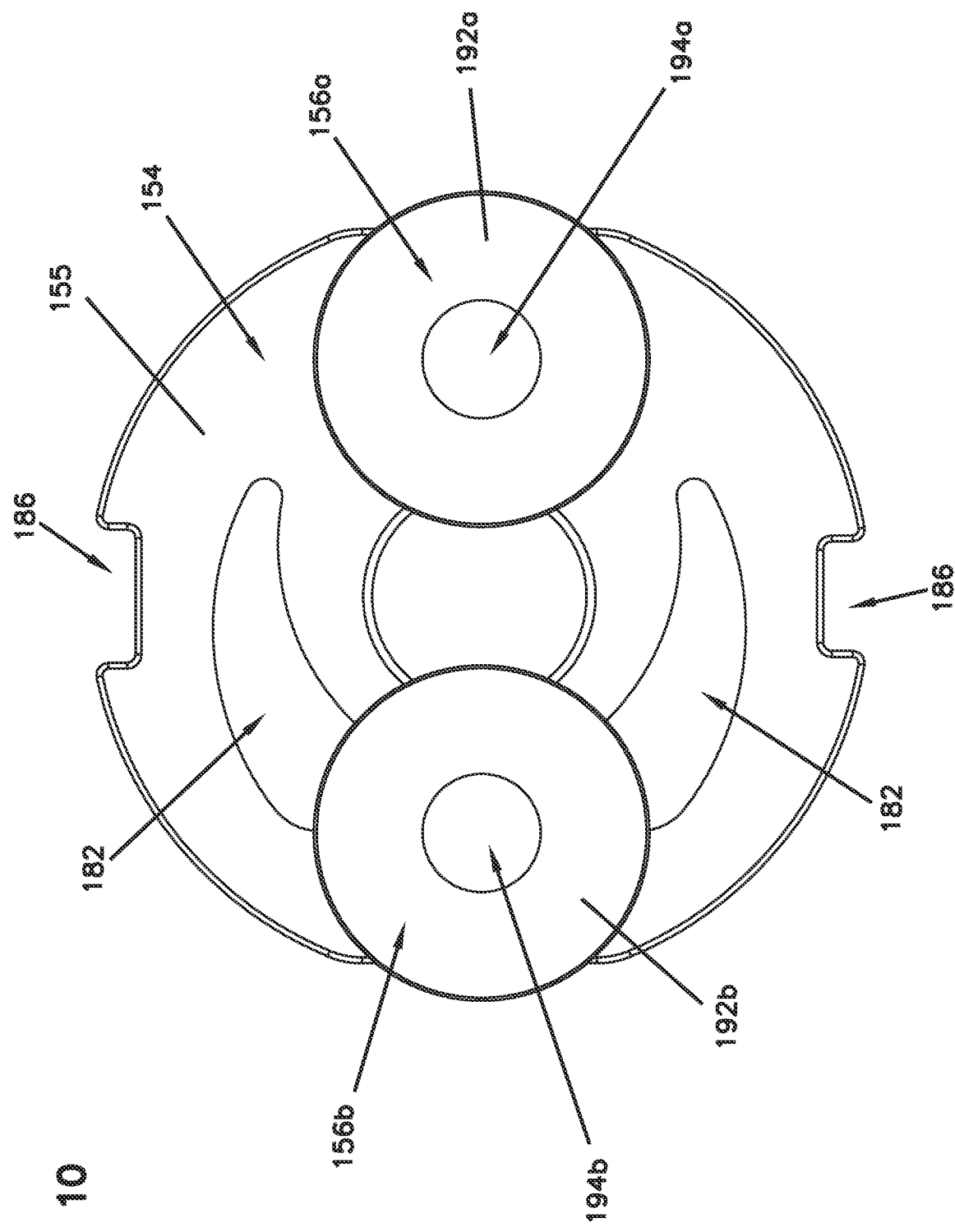
FIG. 10 illustrates a bottom view of the flow control disc and the pair of auxiliary discs of FIG. 9 in the OFF position.

FIG. 10 shows a bottom view of the main flow control disc 154 and the first and second auxiliary discs 156*a*, 156*b* when the flow control disc 154 is in an OFF position.

Figure 11:
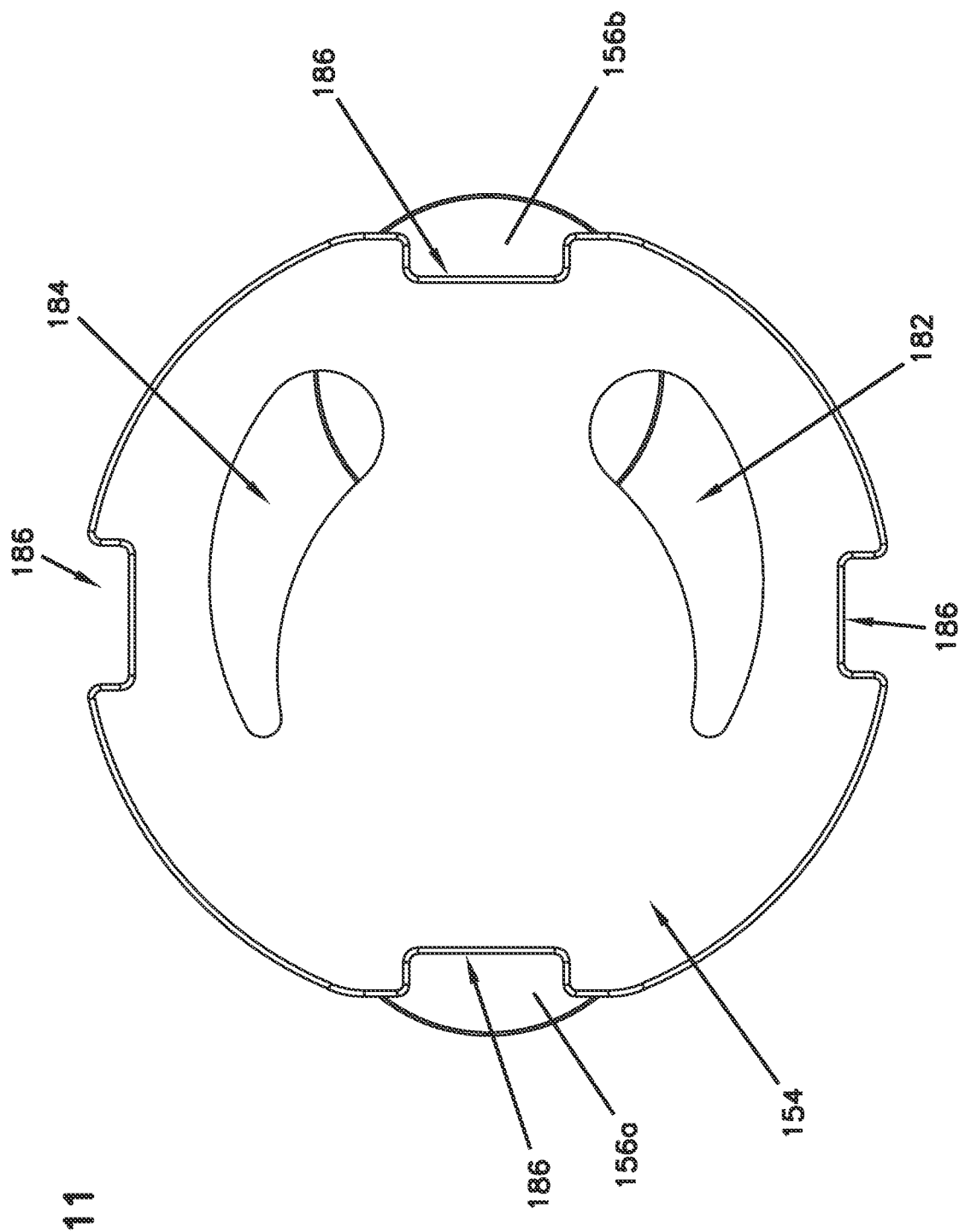
FIG. 11 illustrates a top view of the flow control disc and the pair of auxiliary discs of FIG. 9 in the OFF position.

FIG. 11 shows a top view of the main flow control disc 154 and the first and second auxiliary discs 156*a*, 156*b* when the flow control disc 154 is in an OFF position.

Figure 12:
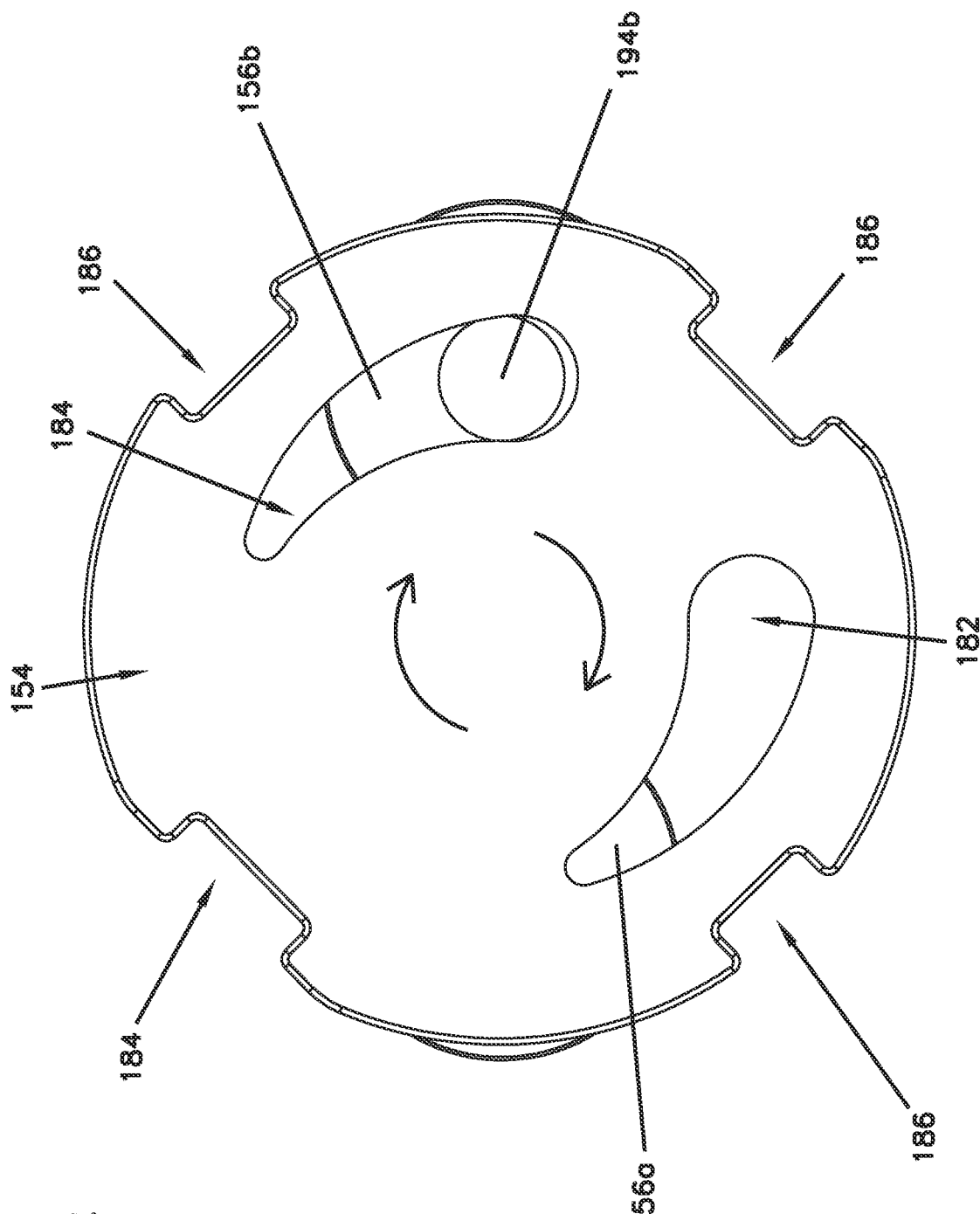
FIG. 12 illustrates a top view of the flow control disc and the pair of auxiliary discs of FIG. 9 in an ON position.

FIG. 12 shows a top view of the flow control disc 154 and the first and second auxiliary discs 156*a*, 156*b* when the flow control disc 154 in an ON position. The control disc 154 is considered to have an ON position when at least one of the hot and cold openings 182, 184 are at least partially aligned with at least one of the central apertures 196*a*, 196*b* of the first and second auxiliary discs 156*a*, 156*b*. In some examples, the control disc 154 has a plurality of ON positions. As shown in FIG. 12, the central aperture 194*b* of the second auxiliary disc 156*b* is aligned with the cold opening 184 of the control disc 154 to deliver only cold water to the outlets 140.

As shown, both the hot and cold openings 182, 184 of the control disc 154 have a teardrop shape, resulting in a tapered width of the openings 182, 184 along the length of the openings 182, 184. The control disc 154 is shown rotated in a clockwise direction from the OFF position. Due to the tapered shape of the cold water opening 184, as the control disc 154 is further rotated in a clockwise direction, the amount of cold water allowed through the cold water opening 184 is reduced.

Figure 13:
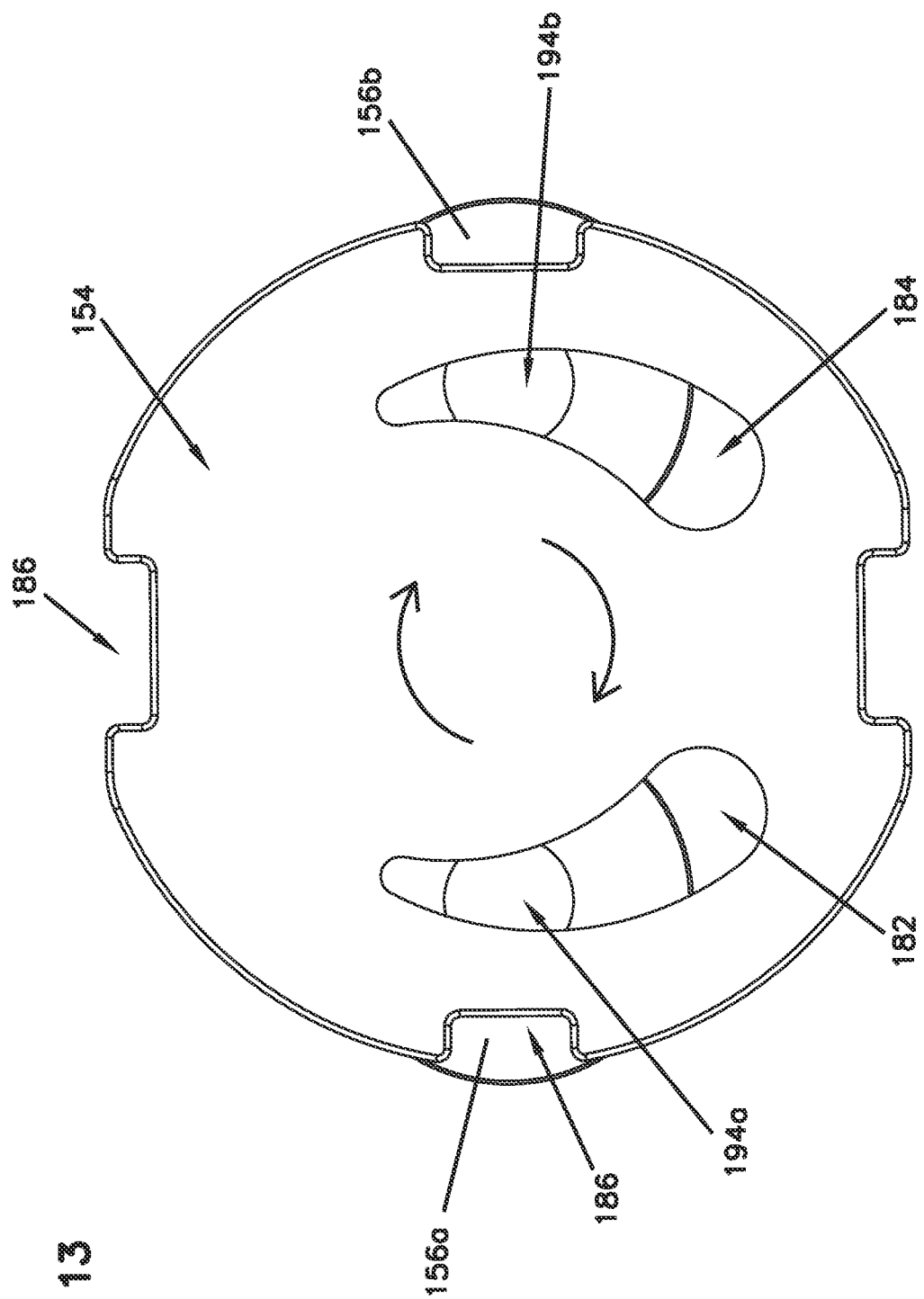
FIG. 13 illustrates a top view of the flow control disc and the pair of auxiliary discs of FIG. 9 in another ON position.

FIG. 13 shows a top view of the main flow control disc 154 and the first and second auxiliary discs 156*a*, 156*b* when the main flow control disc 154 is in another ON position. As shown, the central apertures 194*a*, 194*b* of the first and second auxiliary discs 156*a*, 156*b* are aligned with the hot and cold openings 182, 184 of the control disc 154 so as to a mixed stream of hot and cold water 124 to the outlets 140.

Figure 14:
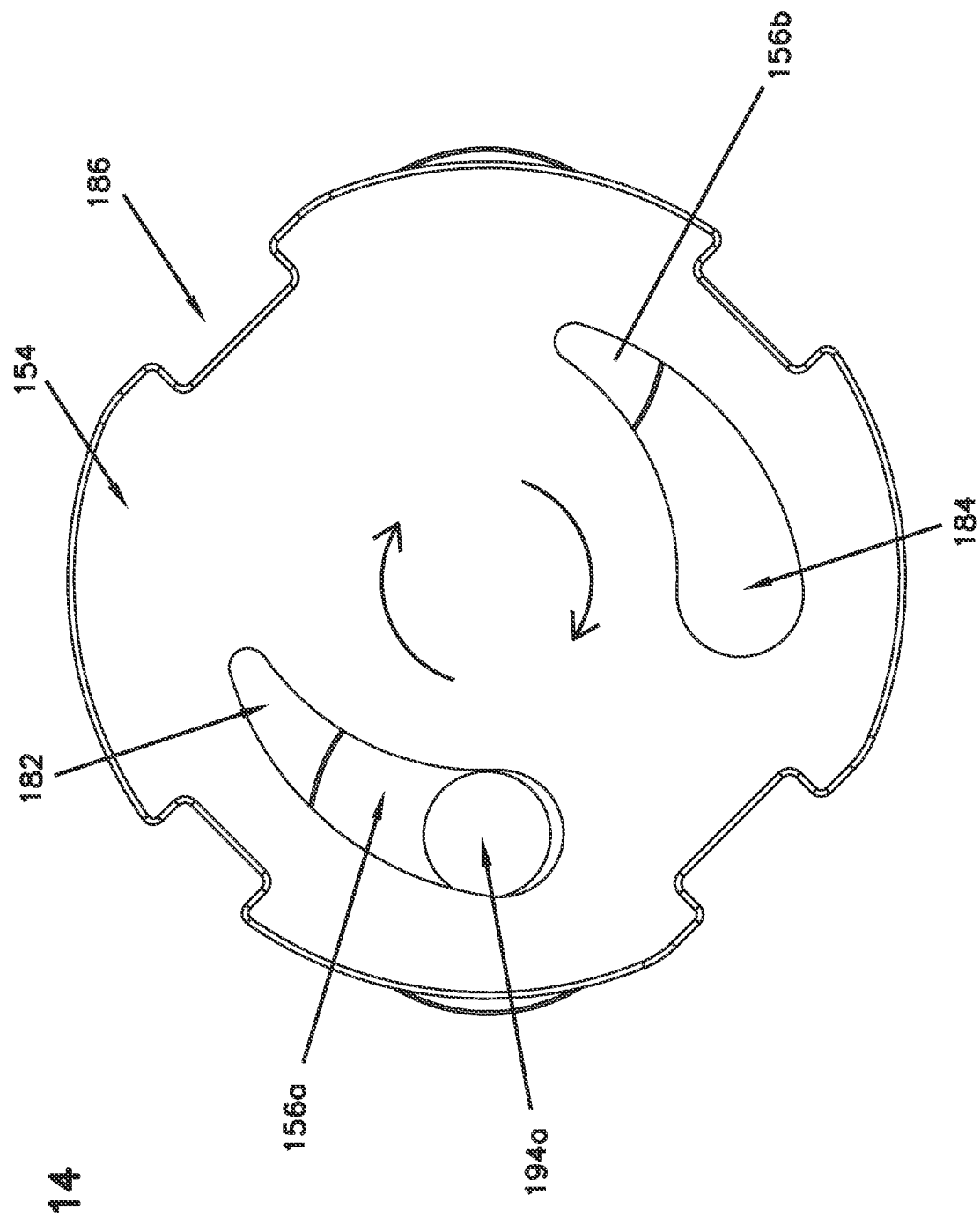
FIG. 14 illustrates a top view of the flow control disc and the pair of auxiliary discs of FIG. 9 in another ON position.

FIG. 14 shows a top view of the main flow control disc 154 and the first and second auxiliary discs 156*a*, 156*b* when the main flow control disc 154 is in another ON position. As shown, the central aperture 194*a* of the first auxiliary disc 156*a* is aligned with the hot water opening 182 of the control disc 154 to deliver only hot water to the outlets 140. Due to the tapered shape of the hot water opening 182, as the control disc 154 is rotated in a clockwise direction, the amount of hot water allowed through the hot water opening 182 is increased. In some examples, the hot water limiter 144 can limit the rotation of the stem 134, and thereby the control disc 154, to limit the fluid communication of the hot water opening 182 and the central aperture 194*a* of the first auxiliary disc 156*a*.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

I claim:

1. A valve cartridge comprising:
    a valve body defining:
        a hot water port fluidically connected to a hot water recess; and
        a cold water port fluidically connected to a cold water recess;
    a rotatable control stem disposed at least partially within the valve body;
    a main flow control disc coupled to the control stem, the main flow control disc having a cold water opening and a hot water opening;
    a first auxiliary disc positioned between a first end of the hot water port and the main flow control disc, the first auxiliary disc being positioned at least partially within the hot water recess; and
    a second auxiliary disc positioned between a first end of the cold water port and the main flow control disc, the second auxiliary disc being positioned at least partially within the cold water recess;
    a first seal forming a seal between the hot water recess and the first auxiliary disc; and
    a second seal forming a seal between the cold water recess and the second auxiliary disc;
    wherein the main flow control disc, the first auxiliary disc, and the second auxiliary disc are constructed of a ceramic material.

2. The valve cartridge of claim 1, wherein the first seal is positioned between a seal shoulder of the hot water recess and the first auxiliary disc.

3. The valve cartridge of claim 1, wherein the second seal is positioned between a seal shoulder of the cold water recess and the second auxiliary disc.

4. The valve cartridge of claim 1, wherein the hot water recess and the cold water recess are formed in the valve body.

5. The valve cartridge of claim 1, wherein the first auxiliary disc includes an aperture aligned with the hot water port and the second auxiliary disc includes an aperture aligned with the cold water port.

6. The valve cartridge of claim 1, wherein the main flow control disc has an interface surface facing the first auxiliary disc and the second auxiliary disc, and wherein less than the entire interface surface contacts the first auxiliary disc and the second auxiliary disc.

7. The valve cartridge of claim 1, wherein the rotatable control stem is rotatable to selectively align the cold water opening of the main flow control disc with the cold water port.

8. The valve cartridge of claim 1, wherein the rotatable control stem is rotatable to selectively align the hot water opening of the main flow control disc with the hot water port.

9. The valve cartridge of claim 1, wherein the ceramic material comprises an aluminum oxide.

10. A fluid control assembly comprising:
    a valve cartridge positioned within the fluid control assembly, the valve cartridge comprising:
        a valve body defining:
            a hot water port fluidically connected to a hot water recess; and
            a cold water port fluidically connected to a cold water recess;
        a rotatable control stem disposed at least partially within the valve body;
        a main flow control disc coupled to the control stem, the main flow control disc having a cold water opening and a hot water opening;
        a first auxiliary disc positioned between a first end of the hot water port and the main flow control disc, the first auxiliary disc being positioned at least partially within the hot water recess; and
        a second auxiliary disc positioned between a first end of the cold water port and the main flow control disc, the second auxiliary disc being positioned at least partially within the cold water recess;
        a first seal forming a seal between the hot water recess and the first auxiliary disc; and
        a second seal forming a seal between the cold water recess and the second auxiliary disc;
        wherein the main flow control disc, the first auxiliary disc, and the second auxiliary disc are constructed of a ceramic material.

11. The fluid control assembly of claim 10, wherein the fluid control assembly comprises a sink faucet.

12. The fluid control assembly of claim 10, wherein the fluid control assembly comprises a shower system.

13. The fluid control assembly of claim 10, wherein the fluid control assembly comprises a bathtub system.

14. The fluid control assembly of claim 10, wherein the first auxiliary disc has a central aperture selectably fluidically connecting the hot water port to the hot water opening of the main flow control disc.

15. The fluid control assembly of claim 10, wherein the second auxiliary disc has a central aperture selectably fluidically connecting the cold water port to the cold water opening of the main flow control disc.

16. The fluid control assembly of claim 10, wherein the main flow control disc has an interface surface facing the first auxiliary disc and the second auxiliary disc, and wherein less than the entire interface surface contacts the first auxiliary disc and the second auxiliary disc.

17. The fluid control assembly of claim 10, wherein the cold water opening and the hot water opening of the main flow control disc each have a tapered shape.

18. The fluid control assembly of claim 10, wherein friction between the main flow control disc and the first and second auxiliary discs provides a reduced resistance to rotation of the rotatable control stem.

19. The fluid control assembly of claim 10, wherein at least a portion of the fluid control assembly is mounted behind a wall as part of a shower system.

* * * * *